US012304228B2

(12) United States Patent
Mano et al.

(10) Patent No.: US 12,304,228 B2
(45) Date of Patent: May 20, 2025

(54) GARMENT GRIPPER

(71) Applicant: Kornit Digital Ltd., Rosh HaAyin (IL)

(72) Inventors: Ilan Shmuel Mano, Ramat-Gan (IL); Alon Polakevich, Pardes Hanna (IL); Yogev Aloni, Rosh HaAyin (IL)

(73) Assignee: Kornit Digital Ltd., Rosh HaAyin (IL)

( * ) Notice: Subject to any disclaimer, the term of this patent is extended or adjusted under 35 U.S.C. 154(b) by 0 days.

(21) Appl. No.: 17/916,808

(22) PCT Filed: Apr. 5, 2021

(86) PCT No.: PCT/IL2021/050379
§ 371 (c)(1),
(2) Date: Oct. 4, 2022

(87) PCT Pub. No.: WO2021/205436
PCT Pub. Date: Oct. 14, 2021

(65) Prior Publication Data

US 2023/0150276 A1 May 18, 2023

Related U.S. Application Data

(60) Provisional application No. 63/006,192, filed on Apr. 7, 2020.

(30) Foreign Application Priority Data

Apr. 6, 2020 (IL) .......................................... 273846

(51) Int. Cl.
*B41J 3/407* (2006.01)
*B65H 5/08* (2006.01)

(52) U.S. Cl.
CPC .............. *B41J 3/4078* (2013.01); *B65H 5/08* (2013.01); *B65H 2511/52* (2013.01); *B65H 2553/42* (2013.01)

(58) Field of Classification Search
None
See application file for complete search history.

(56) References Cited

U.S. PATENT DOCUMENTS 4,875,268 A 10/1989 Szarka
6,295,929 B1 10/2001 Tice et al.
(Continued)

FOREIGN PATENT DOCUMENTS

AU 2001135132 11/2001
CN 1583406 2/2005
(Continued)

OTHER PUBLICATIONS

International Preliminary Report on Patentability Dated Oct. 20, 2022 From the International Bureau of WIPO Re. Application No. PCT/IL2021/050379. (8 Pages).
(Continued)

*Primary Examiner* — Joshua D Zimmerman

(57) ABSTRACT

A garment feeder for feeding a garment for printing, comprises a loading position for a pallet and robotic grippers movable across the loading position to grip a garment from a first side of the loading position and pull the garment in a garment pull direction to a second side of the loading position to load the garment onto the pallet in the loading position. The garment being loaded slips across the loading position on the first side of the pallet perpendicular to the garment pull direction, and one or more sensors detect widthwise edges of the garment, now being pulled onto the pallet by the grippers. The positions of the edges can be used to determine if the garment is being pulled symmetrically onto the pallet. If not then the garment is adjusted to achieve correct positioning for printing.

21 Claims, 2 Drawing Sheets

(56) References Cited

U.S. PATENT DOCUMENTS

| | | | | |
|---|---|---|---|---|
| 6,318,262 | B1 | 11/2001 | Wolber et al. | |
| 6,439,370 | B1 | 8/2002 | Hoffman, Jr. et al. | |
| 2001/0029657 | A1* | 10/2001 | Eppinger | B41F 15/0863 29/448 |
| 2010/0092677 | A1 | 4/2010 | Ozawa | |
| 2020/0307277 | A1* | 10/2020 | Snir | B41J 13/22 |

FOREIGN PATENT DOCUMENTS

| | | | |
|---|---|---|---|
| CN | 205220021 | 5/2016 | |
| CN | 107107623 | 8/2017 | |
| CN | 108391877 | 8/2018 | |
| CN | 109968851 | 7/2019 | |
| CN | 110667260 | 1/2020 | |
| DE | 102017215746 | 3/2019 | |
| EP | 0468842 | 1/1992 | |
| EP | 1147890 | 10/2001 | |
| WO | WO 2008/146143 | 12/2008 | |
| WO | WO 2019/092727 | 5/2019 | |
| WO | WO-2019092727 A1 * | 5/2019 | B41J 11/06 |
| WO | WO 2021/205436 | 10/2021 | |

OTHER PUBLICATIONS

International Search Report and the Written Opinion Dated Jul. 15, 2021 From the International Searching Authority Re. Application No. PCT/IL2021/050379. (13 Pages).

Office Action and Search Report Dated Aug. 13, 2020 From the Israel Patent Office Re. Application No. 273846.

Supplementary European Search Report and the European Search Opinion Dated Apr. 2, 2024 From the European Patent Office Re. Application No. 21783784.8. (34 Pages).

Notification of Office Action and Search Report Dated Jan. 24, 2025 From the National Intellectual Property Administration of the People's Republic of China Re. Application No. 202180033104.0 and Its Translation Into English. (13 Pages).

* cited by examiner

GARMENT GRIPPER

RELATED APPLICATIONS

This application is a National Phase of PCT Patent Application No.

PCT/IL2021/050379 having International filing date of Apr. 5, 2021, which claims the benefit of priority of Israel Application No. 273846 field on Apr. 6, 2020 and under 35 USC § 119(e) of U.S. Provisional Patent Application No. 63/006,192 filed on Apr. 7. 2020. The contents of which the above applications are all incorporated-herein by reference as if fully set forth herein in their entirety.

FIELD AND BACKGROUND OF THE INVENTION

The present invention, in some embodiments thereof, relates to a garment feeder and, more particularly, but not exclusively, to a feeder for feeding a garment into a textile printer.

A garment printer has a pallet or tray on which the garment is carried through the printer. In the past, feeding would involve an operator placing the garment for printing on the pallet. However, there is often little time for an operator to smooth out a garment on the pallet. Often a time budget of nine seconds is all that is provided for placing the garment in position. In more recent technology, a gripper has been provided which takes up the garment from the rear of the pallet and pulls the garment across the pallet. The operator has the simpler task of placing the garment on or in front of the gripper, and more sophisticated devices do not require an operator at all but may take the garment from the top of a pile without human intervention.

The garment gripper is an industrial robot and, like the human operator, has very little time to place the garment on the tray. The robot is typically fed the garment, whether from a pile of garments at the side or from a human operator and provided the gripper grips the garment at symmetrical locations, the garment will be taken up evenly onto the pallet. If the garment is not placed symmetrically on the pallet then the print will be crooked. In a typical case, the operator has about two seconds to make any adjustments once the gripper has placed the garment on the pallet. Detecting asymmetry is something the human eye is good at, so that a very slight change in distribution of area can be easily spotted by the human eye if it leads to asymmetry, but is much more difficult for machine vision to detect.

SUMMARY OF THE INVENTION

In the present embodiments a pallet is associated with sensing to detect the garment above or before the pallet. The sensors could be light or touch sensitive detectors on or before the pallet itself, or a camera from above could take an image of the garment. The sensing reveals any asymmetry in view of the pallet and the garment. In response to asymmetry detection the embodiments may either adjust the gripper to restore symmetry or call the human operator.

An advantage of the present embodiments is that the problem of machine imaging to judge symmetry is reduced, by the introduction of the sensors associated with the pallet, to measure symmetry and placement of the garment.

According to an aspect of some embodiments of the present invention there is provided a garment feeder for feeding a garment for printing, comprising:

a loading position for a pallet;

a gripper unit configured to grip the garment and pull the garment onto the pallet; and at least one sensor associated with the pallet to detect widthwise edges of a garment being pulled onto the pallet by the gripper unit.

Embodiments may comprise a bar extending perpendicularly to the loading direction on a garment loading side of the loading position, the bar being in a plane of a pallet being loaded in the loading position. The garment slides over the bar onto the pallet and the sensor is either on the bar or measures the garment edges against the bar.

Embodiments may comprise an alerting device configured to issue an alert state when the at least one sensor detects that the garment being pulled is not pulled symmetrically widthwise over the pallet.

In an embodiment, the gripper unit comprises two arms and at least two gripper ends movable across the loading position to grip a garment from a first side of the loading position and pull the garment in the pull direction to a second side of the loading position to load the garment onto a pallet located in the loading position.

Embodiments may comprise a gripping adjuster configured to adjust the at least two grippers to move the garment to a symmetrical position, or to adjust a distance between the grippers to grip the garment over an adjusted width.

In an embodiment, the gripping adjuster comprises a motion controller configured to operate an actuator to move at least one of the grippers.

In an embodiment, the sensor comprises at least one touch sensor or proximity sensor along a length of the bar or the pallet to distinguish locations along the bar or the pallet touched by the garment from locations along the bar or the pallet not touched by the garment.

Additionally or alternatively, the sensor comprises at least one light sensor along a length of the bar to distinguish locations along the bar or the pallet shaded by the garment from locations along the bar or the pallet not shaded by the garment.

Additionally or alternatively, the sensor comprises at least one camera above the bar or the pallet to distinguish locations along the bar or the pallet touched by the garment from locations along the bar or the pallet not touched by the garment.

In an embodiment, the bar comprises markings visible to the camera.

Embodiments may operate to determine a width of the garment from an output of the at least one sensor. From the width, the size of the garment may be determined, and the feeder may output an alert if the determined width is different from an expected width.

According to a second aspect of the present invention there is provided a garment feeding method for feeding a garment for printing, comprising:

Positioning a pallet at a loading position;

Mechanically gripping a garment from a first side of the loading position and pulling the garment in a garment pull direction to a second side of the loading position to load the garment on the pallet; and Sensing to locate widthwise edges of the garment being pulled over onto the pallet.

The method may comprise using the locations of the widthwise edges to determine whether the garment is being pulled symmetrically onto the pallet.

The method may comprise using a horizontal bar located in front of the first side of the pallet and perpendicular to the garment pull direction against which to detect the widthwise edges.

The method may comprise issuing an alert state when the at least one sensor detects that the garment being pulled is not symmetrically located over at least one of the bar and the pallet.

The method may comprise using at least two grippers extending across the loading position to grip a garment; and adjusting the at least two grippers to move the garment to a symmetrical position, for example by operating an actuator to move at least one of the grippers.

The method may comprise sensing contact with the garment along a length of the bar to distinguish locations along the bar or the pallet touched by the garment from locations along the bar or the pallet not touched by the garment.

Alternatively or additionally the method may comprise sensing light along a length of the bar or the pallet to distinguish locations along the bar or the pallet shaded by the garment from locations along the bar or the pallet not shaded by the garment.

Alternatively or additionally the method may comprise taking an image from above the bar or the pallet to distinguish locations along the bar or the pallet touched by the garment from locations along the bar or the pallet not touched by the garment.

The method may comprise determining a width of the garment from the sensing, from which a garment size may be determined. The method may then issue an alert if the determined width or size is different from an expected width or size.

The method may comprise detecting a color of the garment and issuing an alert if the color is different from an expected color.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
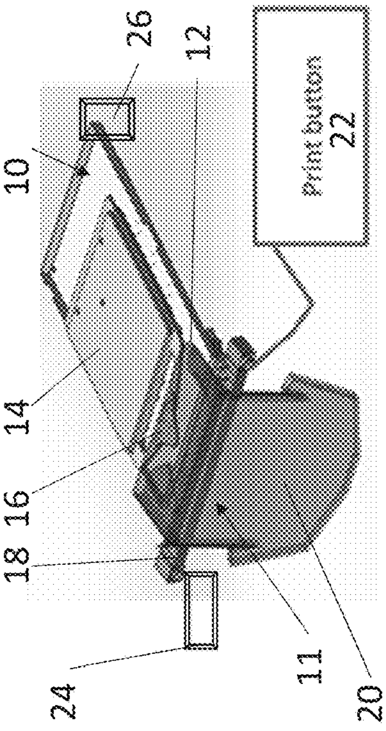
FIG. 1 is a simplified schematic diagram of a garment feeder according to embodiments of the present invention.

The present invention, in some embodiments thereof, relates to a garment feeder and, more particularly, but not exclusively, to a garment feeder for feeding a garment into a printer.

In many printing machines, particularly digital printing machines, a textile to be printed is placed on a pallet which carries the textile through the printer and provides support for the textile while printing takes place.

In some cases, the printing of a ready-made garment differs from printing of a textile in that the garment is fitted around the pallet so that the side to be printed is on top of the pallet and the other side of the garment is below the pallet. Typically a pallet for ready-made garments has a shaped collar to make it easier for an operator to fit the garment around the pallet.

In some machines, the operator places the end of the garment over the collar and then robot grippers grab the end of the garment and pull the garment over the pallet. The operator must take care that the garment is symmetrically placed on the pallet otherwise the print may be crooked or otherwise incorrectly positioned. However the operator only has around two seconds to set the garment and thus there is very little time to concentrate on the correct positioning. If the garment is incorrectly positioned after pulling by the robot grippers, then the operator has to manually adjust the grippers, or adjust the garment on the pallet.

The present embodiments detect the width of the garment and may check the alignment of the garment relative to the pallet. The sensors may be on or over the pallet. One embodiment may provide a horizontal bar across the front of the collar of the pallet. Sensors may measure where the bar is occluded by the garment and thus determine the size of the garment or whether the garment is placed symmetrically or not. In the event that the bar is not symmetrical one or other of the grippers may be adjusted until the garment is symmetrically located over the bar. Additionally or alternatively, an alert or alarm may be issued to the operator to make an adjustment manually. The adjustment may be of the garment itself, or of the grippers holding the garment.

More particularly, the present embodiments may provide a garment feeder for feeding a garment for printing, comprises a loading position for a pallet and robotic grippers movable across the loading position to grip a garment from a first side of the loading position and pull the garment in a garment pull direction to a second side of the loading position to load the garment onto the pallet in the loading position. The garment being loaded slips over a bar across the loading position on the first side of the pallet perpendicular to the garment pull direction, which bar is associated with one or more sensors to detect whether the garment, now being pulled over the bar by the grippers, symmetrically covers the bar. If not then the garment is adjusted to achieve correct positioning for printing.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Referring now to the drawings, FIG. 1 illustrates a feeder 10 for a garment printer. The feeder 10 includes a mechanical garment gripping device 11 that has two garment grippers 12 on robot arms. The feeder further includes a pallet 14 having a collar 16. The pallet is shown in a garment loading, or parking, position, and a horizontal bar 18 is placed on the garment feed side of pallet 14, across the front of the pallet for measuring the widthwise position of the garment. The grippers grip the end of garment 20 at two locations to pull the garment 20 over the bar 18, past the collar 16 and onto the pallet 14 so that the pallet fits inside the garment and the side of the garment to be printed is on the upper side of the pallet. In an alternative embodiment the bar is not added and the garment is loaded directly onto the pallet and the measurements are carried out in view of the pallet directly without the bar in between. A print button 22 may be available for operating the feeder to send the garment for printing.

In use, the garment gripper reaches across the pallet 14 with robot arms 11 and grips the ends of the garment as presented by the operator when fitting the garment over collar 16. In an alternative embodiment the operator is not involved and the grippers take hold of the top garment from a pile of garments and pull the garment over the bar, if provided, and then on to the pallet. There are typically two gripping arms 11, and grippers 12 at the end of each arm grip the ends of the garment at two locations. The grippers then pull the garment over the length of the pallet 14 so that the garment encloses the pallet. The side of the garment to be printed is face up on the pallet and lies lengthwise along the pallet for printing.

The garment feeder includes a loading position for the pallet, and FIG. 1 shows the pallet 14 in the loading position.

The bar 18 extends horizontally across the front of the loading position, perpendicular to the lengthwise direction of the pallet and may be slightly lower than the collar so that a garment loaded onto the pallet passes over the bar. The bar is associated with sensors for sensing whether the garment is symmetrically placed. That is to say, one or more sensors detect what part of the bar is occluded by the garment currently being loaded. The detection gives two pieces of information. Firstly it provides information about whether the garment is symmetrically placed over the bar and secondly it detects the width of the garment, as will be discussed in greater detail below. As described above the detection may be made without the bar and directly with the pallet. The pallet is the end part that is aligned with the garment so that the garment is symmetrically laid out on the pallet Thus, in an embodiment, the detection of the garment is carried out directly against the pallet without the intermediary of the bar.

Nevertheless the use of a bar is advantageous as it simplifies the system and provides an intermediary part for the operator to more easily see and align the garment against the pallet.

An alerting device such as optional screen 24, or an audible alert device, may issue an alert state to tell the operator that the garment is not symmetrically located on the bar. In such a case the operator may manually adjust the placement of the garment, for example by adjusting one of the grippers. In this case one or both of the grippers may be manually adjustable. The adjustment may be by eye, or the measurement at the bar may continue, so that the operator adjusts the garment until the alert disappears, or some combination of both adjustment by eye and by machine may be used.

Alternatively or additionally, a gripping adjuster 26, which may be part of the robotic controller of the robot arms, may electronically adjust one or both of the grippers to move the garment to a symmetrical position. The gripping adjuster may be a motion controller and may operate an actuator in one or both of the robot arms to move one or both of the grippers. The moving of the grippers may be coordinated with continued measurement of symmetry of the garment at the bar so that the garment reaches a symmetrical position.

Sensing may be carried out in any suitable way to determine what part of the bar is occluded by the garment. In one embodiment touch or proximity sensors may extend along the bar to distinguish those locations along the bar touched or occluded by the garment and thus determine whether the garment is symmetrically located. Sensors on the bar may be individually addressable so that signal positions may be instantly translated into garment positions.

In another embodiment, a light source may be located above the bar and above the level at which the garment is placed, and a series of light sensors, typically individually addressable, or one long light sensor with addressable segments, are located along the bar. The light sensors determine which parts of the bar are shaded by the garment. In a variation, light sources, such as small LEDs, are placed along the bar, and a camera detects which of the light sources are occluded. As a further alternative, the bar may simply have markings, such as say on a ruler, and a camera from above may use the markings and image processing to determine the width and location of the garment. It is noted that the image processing does not have to judge symmetry but merely to denote the locations of the two widthwise outer edges of the garment along the bar.

As well as indicating whether the garment is symmetrically located on the bar, one embodiment may compare the detected width of the garment to an expected width, and provide an alert if the measured width differs from the expected width. Thus printing may be stopped if the wrong sized garments have inadvertently been loaded. The expected size may for example be available digitally, from a source defining the order, or may be obtained from a barcode used to set the machine for the particular order. In one embodiment, where optical sensors such as camera are used for detection, the camera may also detect the color of the garment and may provide an alert if the color of the loaded garment is different from the expected color.

Figure 2:
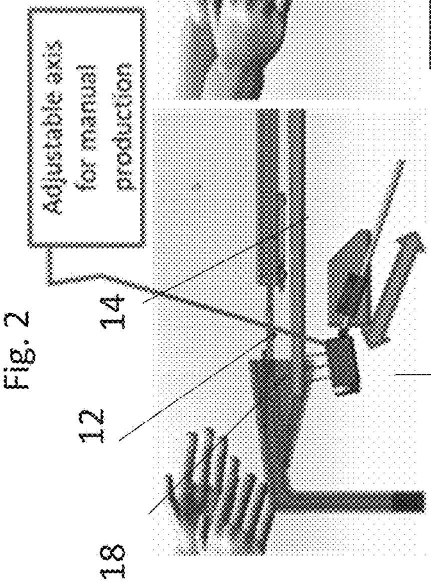
FIG. 2 is a simplified diagram showing a side view of the embodiment of FIG. 1.
Figure 3:
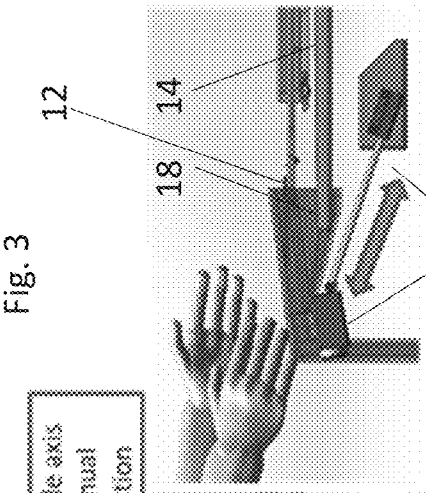
FIG. 3 is a simplified diagram of a side view of the embodiment of FIG. 1 in which the gripper is in a different position.

FIG. 2 illustrates a side view of the pallet and the gripper arm in front of the bar 18. FIG. 3 shows the gripper arm in a different position.

Figure 4:
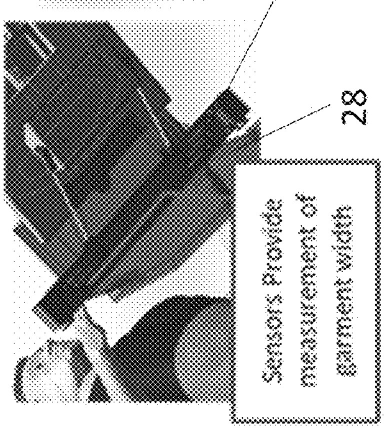
FIG. 4 is a simplified diagram showing the feeder of FIG. 1 from below.

FIG. 4 shows the bar from underneath and illustrates sensors 28 located on the bar. The sensors as shown fit into holes in the bar and project above to sense occlusions due to the garment 20. Such an embodiment allows power to be provided to the sensors in a way that is shielded from the garment itself, which may well be wet or be carrying various preprint chemicals.

Figure 5:
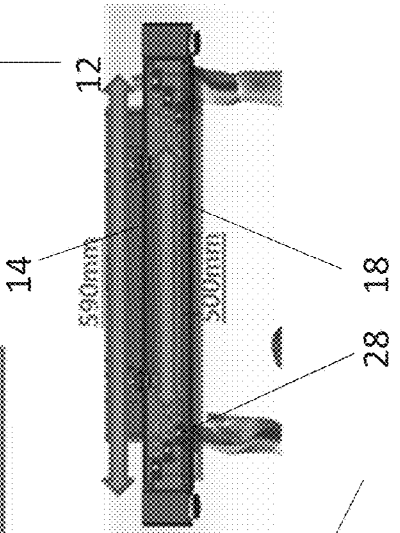
FIG. 5 is a simplified diagram showing the embodiment of FIG. 1 from behind and illustrating relative widths of the bar and the pallet.

FIG. 5 shows a view from behind of the bar 18 and the pallet 14. As shown in the embodiment of FIG. 5, the bar is slightly below the height of the pallet in the loading position so that the garment naturally slides over the bar when being placed on the pallet. Furthermore, the bar may be wider than the pallet so that the full width of the garment as spread flat fits over the bar. On the pallet by contrast, the garment fits in three dimensions around the pallet, and thus takes up less width. The grippers move between two settings, about 500 mm and about 590 mm as in an experiment tabulated in table 1 below.

Referring now made to table 1, results are shown of tests carried out on four different sizes of garment with different distances set between the grippers, 500 mm and 590 mm, as shown in FIG. 5. The first column identifies the specific garment tested and two different garments were used. The results show that for sizes M, L, and XL, a setting of 500 mm between the grippers allowed for a placement error of 10 mm to be corrected within two seconds. For size 3XL, only 11 out of 20 tests succeeded. For a larger spacing of the grippers, namely 590 mm, all twenty tests succeeded at size 3XL as well.

| Grippers - rachet (front) Distance 500 mm | Size | +/−10 mm Within 2 s | | Grippers - rachet (front) Distance 590 mm | Size | +/−10 mm Within 2 s |
|---|---|---|---|---|---|---|
| Promodoro | M | 20/20 | ⇨ | Promodoro | 3XL | 20/20 |
| 3099 | L | 20/20 | | 3099 | 3XL | 20/20 |
| | XL | 20/20 | | Gildan HC | | |
| | 3XL | 11/20 | | | | |
| Gildan HC/ | M | 20/20 | | | | |
| Jansport | L | 20/20 | | | | |
| | XL | 20/20 | | | | |
| | 3XL | 15/20 | | | | |

Figure 6:
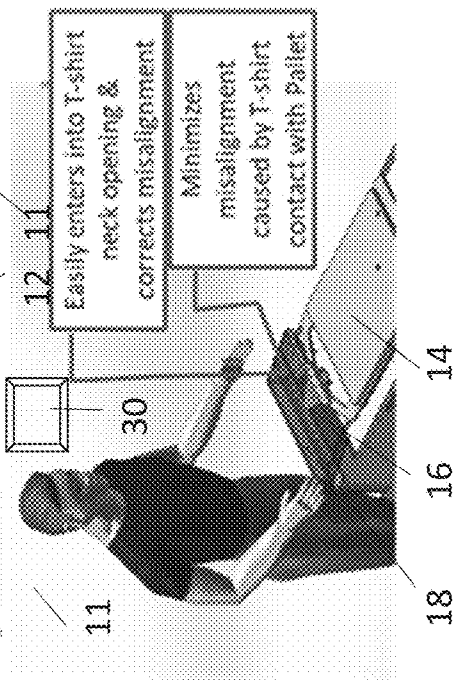
FIG. 6 is a simplified diagram of the feeder of FIG. 1 with a camera taking images from above.

FIG. 6 shows a perspective view from above of the bar 18, the collar 16 and the pallet 14. Camera 30, located above the bar, uses marks on the bar and image processing to calculate the position of the garment on the bar. Such an embodiment has the advantage that no circuitry is needed for the bar.

Figure 7:
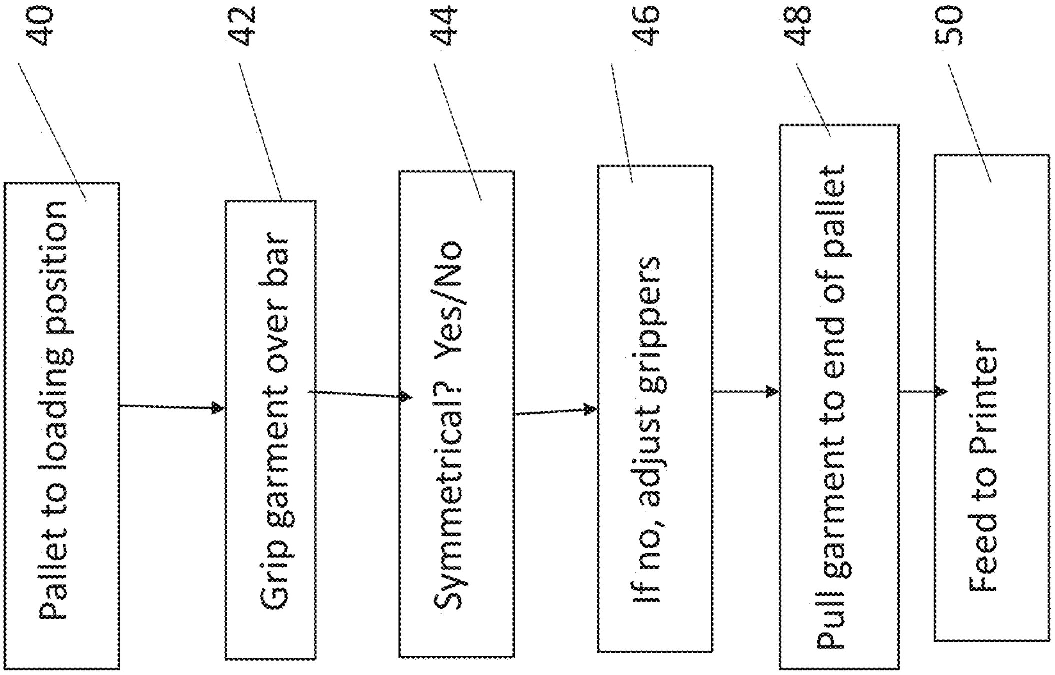
FIG. 7 is a simplified diagram showing a process of loading a garment feeder for printing according to embodiments of the present invention.

Reference is now made to FIG. 7 which is a simplified schematic flow chart illustrating the process of operating a garment feeder according to the present embodiments. A pallet reaches the loading position in the feeder opposite bar 14—box 40. The garment is then gripped over the bar or directly onto the pallet—box 42. This may involve the operator presenting the opened garment to the grippers over the bar, which grippers take hold of the upper side of the garment. Alternatively no operator may be involved and the grippers may take the garment from a pile and pull, either over the bar or directly onto the pallet.

The bar and associated sensors then determine whether the garment is symmetrically placed—box 44. If not, the grippers are adjusted—box 46, and the garment is pulled to the end of the pallet—box 48. Finally, in box 50 the symmetrically loaded pallet is fed to the printer and the garment is printed.

It is expected that during the life of a patent maturing from this application many relevant sensing and robotic technologies will be developed and the scopes of the corresponding terms as well as all others in this document are intended to include all such new technologies a priori.

The terms “comprises”, “comprising”, “includes”, “including”, “having” and their conjugates mean “including but not limited to”.

The term “consisting of” means “including and limited to”.

As used herein, the singular form “a”, “an” and “the” include plural references unless the context clearly dictates otherwise.

It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A garment feeder for feeding a garment for printing, comprising:

a loading position for a pallet;

a gripper unit configured to grip said garment and pull said garment onto said pallet;

at least one garment edge location sensor associated with said pallet to detect locations of widthwise edges of a garment being pulled onto said pallet by said gripper unit; and a bar extending perpendicularly to said loading direction on a garment loading side of said loading position, the bar being in a plane of a pallet being loaded in said loading position, the garment feeder being configured to use said detected locations, said detected locations being in relation to said bar, to determine, from said locations of widthwise edges over in relation to said bar, whether said garment is being pulled or is not being pulled symmetrically widthwise over said pallet and to provide an indication in accordance with said determination.

2. The garment feeder of claim 1, wherein said indication is provided by an alerting device, said alerting device being configured to issue an alert state when said garment feeder determines that said garment being pulled is not pulled symmetrically widthwise over said pallet.

3. The garment feeder of claim 1, wherein said gripper unit comprises two arms and at least two gripper ends movable across said loading position to grip a garment from a first side of said loading position and pull the garment in said pull direction to a second side of said loading position to load the garment onto a pallet located in the loading position.

4. The garment feeder of claim 1, further comprising a gripping adjuster configured to adjust the at least two grippers to move the garment to a symmetrical position, or to adjust a distance between said grippers to grip the garment over an adjusted width.

5. The garment feeder of claim 4, wherein said gripping adjuster comprises a motion controller configured to operate an actuator to move at least one of said grippers.

6. The garment feeder of claim 1, wherein said sensor comprises at least one touch sensor or proximity sensor along a length of said bar or said pallet to distinguish locations along said bar or said pallet touched by said garment from locations along said bar or said pallet not touched by said garment.

7. The garment feeder of claim 1, wherein said sensor comprises at least one light sensor along a length of said bar to distinguish locations along said bar or said pallet shaded by said garment from locations along said bar or said pallet not shaded by said garment.

8. The garment feeder of claim 1, wherein said sensor comprises at least one camera above said bar or said pallet to distinguish locations along said bar or said pallet touched by said garment from locations along said bar or said pallet not touched by said garment.

9. The garment feeder of claim 8, wherein said bar comprises markings visible to said camera.

10. The garment feeder of claim 1, further configured to determine a width of said garment from an output of said at least one sensor.

11. The garment feeder of claim 10, further configured to output an alert if said determined width is different from an expected width.

12. A garment feeding method for feeding a garment for printing, comprising:
- positioning a pallet at a loading position;
- mechanically gripping a garment from a first side of said loading position and pulling the garment in a garment pull direction to a second side of said loading position to load the garment on the pallet;
- sensing to determine outer locations of respective first and second widthwise edges of said garment being pulled over onto the pallet, said sensing using a horizontal bar located in front of said first side of said pallet and perpendicular to said garment pull direction, the bar having markers against which said widthwise edges are located;
- comparing a respective one of said sensed outer locations of said widthwise edges with a respective other of said sensed locations of said widthwise edges to determine whether said garment is being pulled symmetrically onto said pallet; and
- issuing an indication when it is determined that said garment is not being pulled symmetrically onto said pallet.

13. The garment feeding method of claim 12, further comprising issuing an alert state when it is determined that said garment being pulled is not symmetrically located over at least one of said bar and said pallet.

14. The garment feeding method of claim 12, comprising:
- using at least two grippers extending across said loading position to grip a garment; and
- adjusting the at least two grippers to move the garment to a symmetrical position.

15. The garment feeding method of claim 14, comprising operating an actuator to move at least one of said grippers.

16. The garment feeding method of claim 12, comprising sensing contact with said garment along a length of said bar to distinguish locations along said bar or said pallet touched by said garment from locations along said bar or said pallet not touched by said garment.

17. The garment feeding method of claim 12, comprising sensing light along a length of said bar or said pallet to distinguish locations along said bar or said pallet shaded by said garment from locations along said bar or said pallet not shaded by said garment.

18. The garment feeding method of claim 12, comprising taking an image from above said bar or said pallet to distinguish locations along said bar or said pallet touched by said garment from locations along said bar or said pallet not touched by said garment.

19. The garment feeding method of claim 12, comprising determining a width of said garment from said sensing.

20. The garment feeding method of claim 19, comprising issuing an alert if said determined width is different from an expected width.

21. The garment feeding method of claim 12, comprising detecting a color of said garment and issuing an alert if said color is different from an expected color.

* * * * *